United States Patent [19]
Meusel et al.

[11] 3,965,379
[45] June 22, 1976

[54] APPARATUS FOR A ROTATING THYRISTOR EXCITATION

[75] Inventors: Otto Meusel; Otto Dressel, both of Erlangen, Germany

[73] Assignee: Siemens Aktiengesellschaft, Munich, Germany

[22] Filed: Nov. 19, 1974

[21] Appl. No.: 525,085

[30] Foreign Application Priority Data
Nov. 29, 1973 Germany.......................... 2359578

[52] U.S. Cl................................... 310/68 R; 310/59
[51] Int. Cl.²........................................ H02K 11/00
[58] Field of Search ............... 310/159, 160, 68, 75, 310/68 D, 84, 72, 168, 169, 66, 171, 52, 53, 58, 59, 60, 64, 65, 61; 317/260; 318/242; 357/81; 321/8

[56] References Cited
UNITED STATES PATENTS

| | | | |
|---|---|---|---|
| 3,145,314 | 8/1964 | Becker | 310/68 |
| 3,264,482 | 8/1966 | Clark | 290/52 |
| 3,359,438 | 12/1967 | Hylen | 310/68 |
| 3,363,122 | 1/1968 | Hoover | 310/68 |
| 3,371,235 | 2/1968 | Hoover | 310/68 |
| 3,686,523 | 8/1972 | Gorden | 310/68 |
| 3,723,794 | 3/1974 | Spisak | 310/68 D |
| 3,829,725 | 8/1974 | Petersen | 310/72 |
| 3,866,196 | 2/1975 | Mann | 310/68 D |

Primary Examiner—R. Skudy
Attorney, Agent, or Firm—Kenyon & Kenyon Reilly Carr & Chapin

[57] ABSTRACT

An arrangement for the rotating thyristor excitation [RT excitation] in a turbogenerator which is suited for very high centrifugal force loadings in which the carrier discs of the rectifiers wheels are designed in the form of hubs mounted about the shaft secure against turning and having hollow-cylindrical projections extending axially in two directions to form with the shaft recesses into which the semiconductors including their cooling elements and their protective external components as well as the electronic driver units are disposed along the inside diameter of the cylindrical projection on the hubs.

5 Claims, 1 Drawing Figure

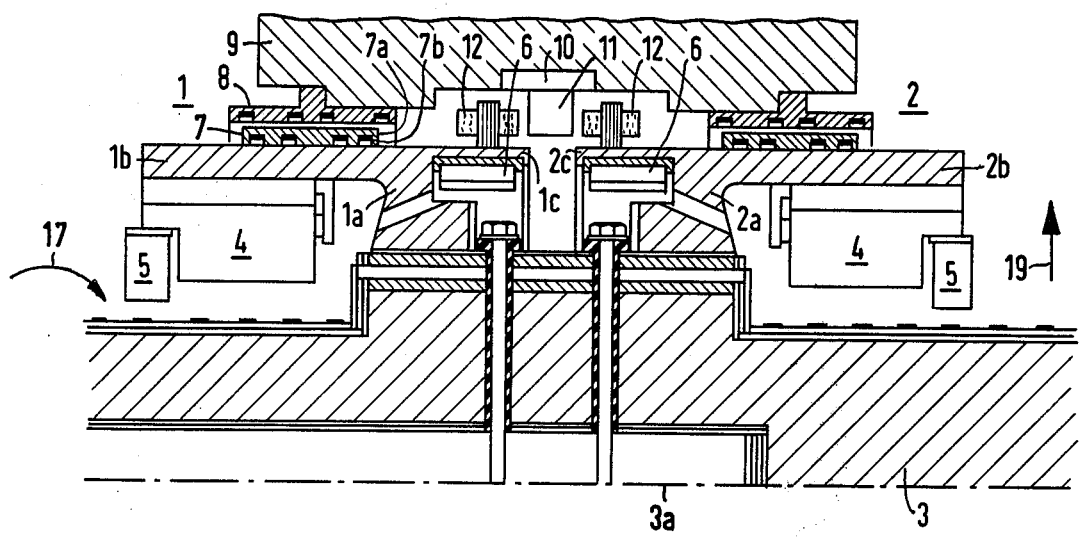

APPARATUS FOR A ROTATING THYRISTOR EXCITATION

BACKGROUND OF THE INVENTION

This invention relates to rotating thyristor excitation in turbogenerators in general and, more particularly, to an improved arrangement for a rotating thyristor excitation which is suited for very high centrifugal force loading.

Where large turbogenerators are involved, the steeply increasing requirement for excitation power leads to the use of brushless excitation with rotating rectifiers as is described in ETZA, 1966, No. 1, pages 1 to 8. In place of the rotating rectifier excitation using diodes which is described therein, thyristors can be employed for particularly fast voltage control. The thyristors and the associated driver units must be disposed on the carrier disc of the rectifier wheel in such a manner that the very large permanent stresses due to the centrifugal force can be withstood.

In view of this, it is an object of the present invention to provide a rectifier wheel design which is well suited for such high permanent stresses.

SUMMARY OF THE INVENTION

The present invention solves this problem by providing carrier discs on the rectifier wheel which are designed in the form of a hub mounted over the shaft and secure against turning with respect thereto. The carrier disc has hollow cylindrical projections which extend axially on both sides to form with the shaft an annular opening. On the inside diameter of one projection of the carrier disc, the semiconductor components including their cooling elements and their protective external components are disposed and on the inside diameter of the other projection the associated electronic control units in a manner insulated with respect to the carrier disc.

The design of the rectifier wheel according to the present invention permits compact construction. Mounting the semiconductor components containing the thyristors and including the cooling elements and protective external components as well as electronic driver units directly to the inside diameter of the axial projections of the carrier disc relieves the fasteners. The arrangement of all these components on the carrier disc of a rectifier wheel permits simple wiring free of interferences.

If a contactless and brushless signal transmission device is provided for a rectifier wheel to transmit ignition pulses to the rectifier wheel and to transmit monitoring signals from the rectifier wheel an advantageous embodiment of the present invention includes the provision of mounting the rotating part of the contactless and brushless signal transmission device on the outside diameter of the carrier disc with its fixed part mounted in the machine housing. In this embodiment the signal transmission device is disposed on the carrier disc of the rectifier wheel instead of being disposed on a separate transmission wheel thereby avoiding the costly electrical connection of the rectifier wheel with the signal transmission device. This saves space and simplifies wiring. In well known fashion, inductive, capacitive, optical or magnetic field-sensitive transmission devices may be used as a contactless and brushless signal transmission device.

In the illustrated embodiment, an inductive signal transmission device with two coaxial, mutually spaced flat coils is used. The inner flat coil is disposed on the outside diameter of the carrier disc and the outer flat coil in the machine housing coaxial with the former. As illustrated, it is advantageous to use a hollow cylindrical coil carrier mounted to the outside diameter of the carrier disc, the inside diameter of the coil carrier presenting grooves for the accommodation of the flat coils. This permits the controlling of action of centrifugal forces on the flat coils in a better manner than if they were fastened to the outside diameter of the hollow portion by cementing or the like.

In accordance with a further feature of the present invention which is particularly advantageous with respect to wiring and space requirements, the current supply of the electronic components is provided by an additional auxiliary exciter machine having a stator with external poles disposed in the machine housing and with windings disposed on the outside diameter of the carrier disc of the rectifier wheel. However, an additional three-phase auxiliary exciter machine for the current supply of the electronic components may also be disposed in the shaft coupling between the three phase main exciter machine and a three-phase auxiliary exciter machine with permanent magnet internal pole for the excitation of the main exciter machine and voltage control.

BRIEF DESCRIPTION OF THE DRAWINGS

The single FIGURE shows a longitudinal cross-sectional view through the shaft of the turbogenerator illustrating the attachment of the apparatus of the present invention.

DETAILED DESCRIPTION OF THE PREFERRED EMBODIMENT

The FIGURE is a longitudinal cross-sectional view through the shaft of a turbogenerator illustrating the attachment of the present invention thereto. In the illustrated arrangement, two rectifier wheels, a positive wheel 1 for the positive potential of the exciter current and negative wheel 2 for the negative potential of the exciter current are provided. Both are attached to the shaft 3 in a manner such that they are fixed with respect to the shaft and will rotate therewith. Only the upper half of the shaft 3, which has its centerline at 3a, is shown. Each of the rectifier wheels comprises a carrier disc, the respective carrier disc being designated 1a and 2a. Each carrier disc 1a, 2a is in the form of a hub which slides over the shaft 3 and which has hollow cylindrical projections extending in both directions. These axially extending projections are designated 1b and 1c and 2b and 2c. The semiconductor components 4 including their cooling elements and their protective external components 5 are mounted to the inside diameter of the projections 1b and 2b, respectively. The associated electronic control units 6 are mounted to the inside diameter of the axial projection 1c and 2c, respectively in a manner insulating them with respect to the carrier disc. With this mounting, as the shaft rotates in the direction of the arrow 17, the centrifugal forces acting on the various components will be outward in the direction of the arrow 19. Thus, instead of trying to throw these components off, were they simply mounted externally, the centrifugal force only pushes the parts against the hollow projections and the possibility of a part flying off due to centrifugal force does not exist. Thus, this design permits withstanding the high centrifugal forces which these parts will be subjected to.

In accordance with a further feature of the present invention, the rotating part 7 of an inductive signal transmission device is mounted to the outside diameter of the respective carrier discs. The rotating part 7 has a corresponding stationary part 8 opposite it and secured to the machine housing 9. The rotating part 7 of the inductive signal transmission devices comprises a hollow cylindrical coil carrier 7a mounted to the outside diameter of the cylindrical carrier disc and having an inside diameter containing grooves for accommodating flat coils 7b. This forms a contactless and brushless signal transmission device. The illustrated embodiment shows the signal transmission device on the positive wheel 1 which can be used for transmitting transmission pulses for the thyristors from the stationary part to the rotating part. The signal transmission device on the minus wheel 2 may be used for transmitting monitoring signals from the rotating part to the stationary part.

Also illustrated on the FIGURE are means for supplying current to the electronic components on the rectifier wheels. These means comprise an additional auxiliary exciter machine having a stator 10 with external poles 11 mounted in the machine housing 9 and having windings 12 disposed on the outside diameter of the carrier discs of the rectifier wheels. This arrangement provides an extremely compact design and reduces wiring cost. It is, of course, possible for the additional auxiliary exciter machine to be disposed in the shaft coupling between the three phase main exciter machine and a three phase auxiliary exciter machine with a permanent (magnet) internal pole for the excitation of the main exciter machine and voltage control.

Thus, an improved arrangement for a rotating thyristor excitation in a turbogenerator has been shown. Although specific embodiments have been illustrated and described, it will be obvious to those skilled in the art that various modifications may be made without departing from the spirit of the invention which is intended to limited solely by the appended claims.

What is claimed is:

1. An arrangement for a rotating thyristor excitation in a turbogenerator including a machine housing and having at least one rectifier wheel including a rotating carrier disc on which the semi-conductor components including elements and protective external components and associated electronic driver units for the semi-conductor components are disposed, the turbogenerator including at least a three-phase main exciter machine, wherein the improvment comprises a carrier disc of the rectifier wheel in the form of a hub securely mounted over the shaft, said hub having hollow-cylindrical projections extending axially on both sides to form with the shaft an annular recess, with the semi-conductor components including their cooling elements and protective external components disposed on the inside of one projection and the associated driver units on the inside of the other projection and insulated against the carrier disc and a contactless and brushless signal transmission device having a stationary part mounted in the machine housing of the turbogenerator and having a rotating part mounted to the outside diameter of said carrier disc.

2. Apparatus according to claim 1 wherein a positive wheel is provided for the positive potential of the exciter current and a negative wheel for the negative potential of the exciter current.

3. Apparatus according to claim 1 wherein said device is an inductive signal transmission device comprised of inner and outer coaxial, mutually spaced flat coils with the inner flat coil disposed on the outside diameter of the carrier disc and the outer flat coil in the machine housing coaxial with the inner coil.

4. Apparatus according to claim 3 and further including a coil carrier mounted to the outside diameter of said carrier disc, said coil carrier having on its inside diameter grooves for the accommodation of said flat coils.

5. Apparatus according to claim 1 and further including a signal transmission device for the transmission of monitoring signals from the rotating part to the stationary part of the turbogenerator.

* * * * *